June 23, 1936. F. J. TONE Re. 20,015

METHOD AND APPARATUS FOR DRYING FRESHLY PRINTED WEBS

Original Filed Oct. 12, 1931

Inventor

Frank J. Tone

By Bates Golrick & Teare

Attorneys

Reissued June 23, 1936

Re. 20,015

UNITED STATES PATENT OFFICE 20,015

METHOD AND APPARATUS FOR DRYING FRESHLY PRINTED WEBS

Frank J. Tone, Niagara Falls, N. Y., assignor to The Carborundum Company, Niagara Falls, N. Y., a corporation of Pennsylvania Original No. 1,941,328, dated December 26, 1933, Serial No. 568,346, October 12, 1931. Application for reissue May 8, 1935, Serial No. 20,442

14 Claims. (Cl. 101—420)

This invention relates to a method and apparatus for drying freshly printed webs, and is particularly applicable for use in connection with the printing of material that has a glossy surface like glazed paper, glassine, "Cellophane" and the like. Furthermore, the present invention embodies an improvement in the process of drying freshly printed webs, which embodies the utilization of a web of granular coated paper which is interleaved with a roll of "Cellophane" after the printing operation has been performed on one surface thereof. The rough surface of the sandpaper is directed toward the printed surface so that the image will dry satisfactorily without being offset when wound in roll form. While this process is advantageous, nevertheless it is not suitable for printing on both sides of the web during the printing operation. Furthermore, when the sandpaper is rolled up and not in use, the abrasive side thereof bears against the smooth side and abrades it to a slight extent, thereby making it dusty. If this dust is then transferred to a sheet of "Cellophane", it is detrimental thereto.

An object of the present invention, therefore, is to provide a method of drying freshly printed webs by means of which the web may, if desired, be printed substantially simultaneously on both sides, and by means of which two webs, each having images printed on one side thereof, may be simultaneously printed and wound in a common roll.

I carry out my invention by taking a web suitably coated with granular material, and interleaving it with a web of "Cellophane", or like material, as it is being wound into a roll so that if the web is printed on both sides it can be protected against offset, or smearing, while drying in the roll. My invention is also adapted for use in connection with the simultaneous printing of two webs of "Cellophane" which are printed only on one side, for in such case the double-coated sheet may be interleaved between the layers of "Cellophane", with the printed surface of each layer in contiguous relationship with the granular material. Thus, a single web with a coating of granular material on each side can be used to dry twice the amount of "Cellophane" over the process described in the above mentioned Holmes application.

Figure 1:
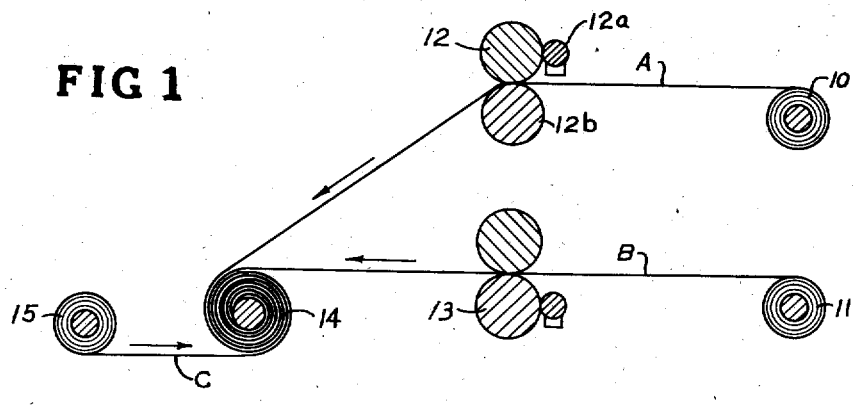
Figure 2:
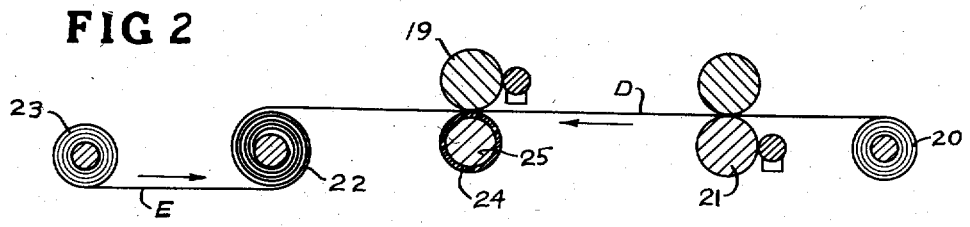

Referring now to the drawing, Fig. 1 is a diagrammatic view illustrating the application of my process in the printing of two webs, and Fig. 2 is a similar view illustrating the application of it in the printing of both sides of a single web.

Considering first the process wherein two webs of non-absorbent material are printed only on one surface thereof, as is shown in Fig. 1, 10 and 11 represent supply rolls of "Cellophane" from which the webs A and B, respectively, are drawn. Suitable printing mechanism (which may comprise a plate roller 12, an inking roller 12a, and a platen roller 12b) may be used for printing on the upper surface of the web A, while a corresponding mechanism 13 may be utilized for printing an image on the under surface of the web B. The two webs are then brought together, back to back, and wound upon a roll 14, while a double coated web C is taken from a supply roll 15 and interleaved into the roll 14 between the printed surfaces of the webs A and B. In this way, each printed surface is in contact with the grain coated surfaces of the web, wherefore the images printed thereon may be satisfactorily dried without offset while the webs are stored in roll form.

Considering a modification of my invention which is shown in Fig. 2, and which embodies an arrangement for printing both sides of a continuous web or sheet of "Cellophane", D indicates the web which is taken from a supply roll 20 and is passed through a printing mechanism 21, which is adapted to print an image on the under surface thereof, and thence through a printing mechanism 19, which is adapted to print an image on the upper surface thereof. The web is then wound on a roll 22 and is interleaved with a web E of paper or cloth having a granular coating on each face thereof, which in turn is taken from a supply roll 23. Any distortion or blurring or blotting of the printed image is prevented during the second printing operation by providing a layer of granular coated paper or cloth 24 around the platen roll 25, which forms part of the mechanism 19.

A granular coated paper or cloth that is adapted for carrying out my invention in connection with the printing of "Cellophane" will produce satisfactory results if the granular material is irregular and angular in shape, hard, and fine enough to pass through a screen having a mesh between 180 and 280. There are many kinds of granular material that are satisfactory for the purpose, among them being feldspar, beryl, spinel, magnetite and enstatite. These materials are mentioned specifically by way of illustration without intent to limit the invention. When paper is used it should be very flexible and comparatively thin so that the double coating of granular material does not make it too thick to readily flex. Furthermore, the material upon which the granular material is coated preferably comprises a continuous sheet of strong, tough paper, such as "Fourdrinier" manila paper, or "Duracel" paper, in which the sheet is of such unitary or unified construction throughout its thickness as to resist splitting into separate layers or laminations from frequent flexing, rolling, and unrolling, to which it is subjected in carrying out my process.

I have found that in some cases the papers usually used by coating do not retain sufficient of their original flexibility after the abrasive coating process to make them best adapted to my invention.

This may be due to the presence, in the paper or in the physical structure of the fibers, of chemically active impurities and oxidized groups (oxycelluloses, usually known as beta and gamma celluloses) which are affected during the coating process and cause the product to be weaker and more brittle. These impurities and oxidized groups also may cause the paper to become more brittle as it becomes older. It is desirable, therefore, to use as a basis for the coated web, a paper from which such active impurities as above mentioned and others have been removed, to produce a flexible, chemically inert paper composed of 90% or over of resilient, alpha cellulose.

A purified cellulose paper such as that sold under the trade name of "Duracel" is especially well adapted for carrying out my invention and its superiority over the paper usually used for coating is indicated by the results obtained from folding tests on the coated paper, using a standard folding machine such as the M. I. T. folding tester described in the book on Paper Testing Materials published by the Technical Association of the Pulp and Paper Industry in 1929. These tests indicate that the "Duracel" paper resists breaking from folding approximately 280% better than the best paper used heretofore.

Paper made of purified cellulose; that is, of alpha cellulose, of which "Duracel" is one example, possesses other properties that make it desirable for use as a base material, the surface or surfaces of which are to be coated with adhesive and granular materials. Among these other desirable properties are: smoothness of surface, strength, incompressibility, and greater resistance to heat.

A smooth surface on the back of a granular coated article is of advantage during the coating process because it is conducive to a more uniform coating of adhesive and granular material. It is advantageous, also, when the article is in use, because a smooth surfaced backing material will generate less frictional heat than one that is rough.

Greater strength and incompressibility are of importance in coated articles because they increase the useful life of the article. Greater strength means that the coated article will resist the disruptive influences incident to its use, while greater incompressibility reduces or eliminates the tendency of the granular material to penetrate or puncture the web when pressure is applied.

A paper that resists heat is desirable for the base material of a granular coated article because it adds to the useful life of the article. Heat of considerable quantity is generated frequently by granular coated articles in their normal operation, and since heat has a deteriorating and sometimes destructive effect upon cellulosic materials, it is desirable to use a material that better resists the action of heat.

An advantage of the present invention is the fact that a double-coated web of sandpaper does the work of two single sheets of single-coated paper, wherefore a material saving in the investment of sandpaper is effected. As this investment is an important item in the cost of operation of the above-mentioned process, it is apparent that this saving is a material advantage; furthermore, the storing of two webs of "Cellophane" upon a single roll greatly reduces the storage space required, and where the web is printed on opposite sides, the printing may be accomplished with a single operation without waiting for the roll to dry and without passing the roll a second time through the press. A further important advantage is the fact that the rolled sandpaper, when not in use, does not create dust, which would be transferred to the "Cellophane" web, as is the case where a single-surfaced web of sandpaper is used.

I claim:

1. The method of drying freshly printed webs, which comprises concomitantly printing images on opposite sides of material and rolling up the printed material in conjunction with a carrier web of material having a gritty surface on each side thereof, so that the freshly printed images on one side contact with one gritty surface of the carrier web, and the freshly printed images on the other side contact with the other gritty surface of the carrier web.

2. The method of drying freshly printed material with moist images on opposite sides thereof, comprising rolling up such material in conjunction with a web of flexible material having gritty surfaces on opposite sides thereof, and then allowing the printed material to dry while in the roll.

3. The method of producing dry images on non-absorbent material, comprising printing such images out of contact with each other on opposite faces of the material, and, while the images are moist, rolling up the material with a double-faced web of sandpaper.

4. The method of drying freshly printed webs, which comprises concomitantly printing two webs and rolling them up in conjunction with a carrier web of material having a gritty surface on each side thereof, so that the freshly printed surface of one printed web contacts with one gritty surface of the carrier web, and the freshly printed surface of the other printed web contacts with the other gritty surface of the carrier web.

5. The combination with a printing apparatus adapted to deliver one or more webs of non-absorbent material having two freshly printed surfaces, of a drying member comprising a carrier having two opposite serrated surfaces for contiguously supporting printed surfaces at a plurality of separated points.

6. Apparatus for drying a printed sheet of non-absorbent material comprising a web composed of substantially pure alpha cellulose and coated on both sides with granular material for continuously supporting the printed surface.

7. Apparatus for drying a printed sheet of non-absorbent material, comprising a web composed of substantially pure alpha cellulose and coated on both sides with granular material, said granular material being irregular and angular in shape, hard and fine enough to pass through 180 to 280 mesh screen.

8. The method of drying simultaneously a pair of printed surfaces, which method comprises the mounting of freshly printed surfaces on the opposite sides of a bilaterally coated abrasive sheet which acts as a separator, whereby the printed surfaces are held in stationary position during drying.

9. The method of drying in one operation web material having freshly printed images on two surfaces facing away from each other, while preventing offset, comprising rolling up the printed material interleaved with a flexible web having continuous gritty surfaces on opposite sides thereof adapted to contact the printed images.

10. The method of drying freshly printed webs which consists in winding up such webs having printed images on opposite sides thereof with flexibly supported gritty surfaces in contact with each printed surface.

11. The method of drying freshly printed webs which comprises concomitantly printing two webs and rolling them up in conjunction with flexibly supported gritty surfaces so that the freshly printed surface of one web contacts with one gritty surface and the freshly printed surface of the other web contacts with the other gritty surface.

12. The method of drying simultaneously a pair of printed surfaces which method comprises the mounting of freshly printed surfaces on the opposite sides of a separating means comprising oppositely facing gritty surfaces, whereby the printed surfaces are held in a stationary position during drying.

13. The combination with a printing apparatus adapted to deliver one or more webs having two freshly printed surfaces of a drying means having two opposite serrated surfaces for contiguously supporting printed surfaces at a plurality of separated points.

14. The combination with a printing apparatus adapted to deliver one or more webs having two freshly printed surfaces of a drying means having two opposite gritty surfaces for contiguously supporting printed surfaces at a plurality of separated points.

FRANK J. TONE.